UNITED STATES PATENT OFFICE.

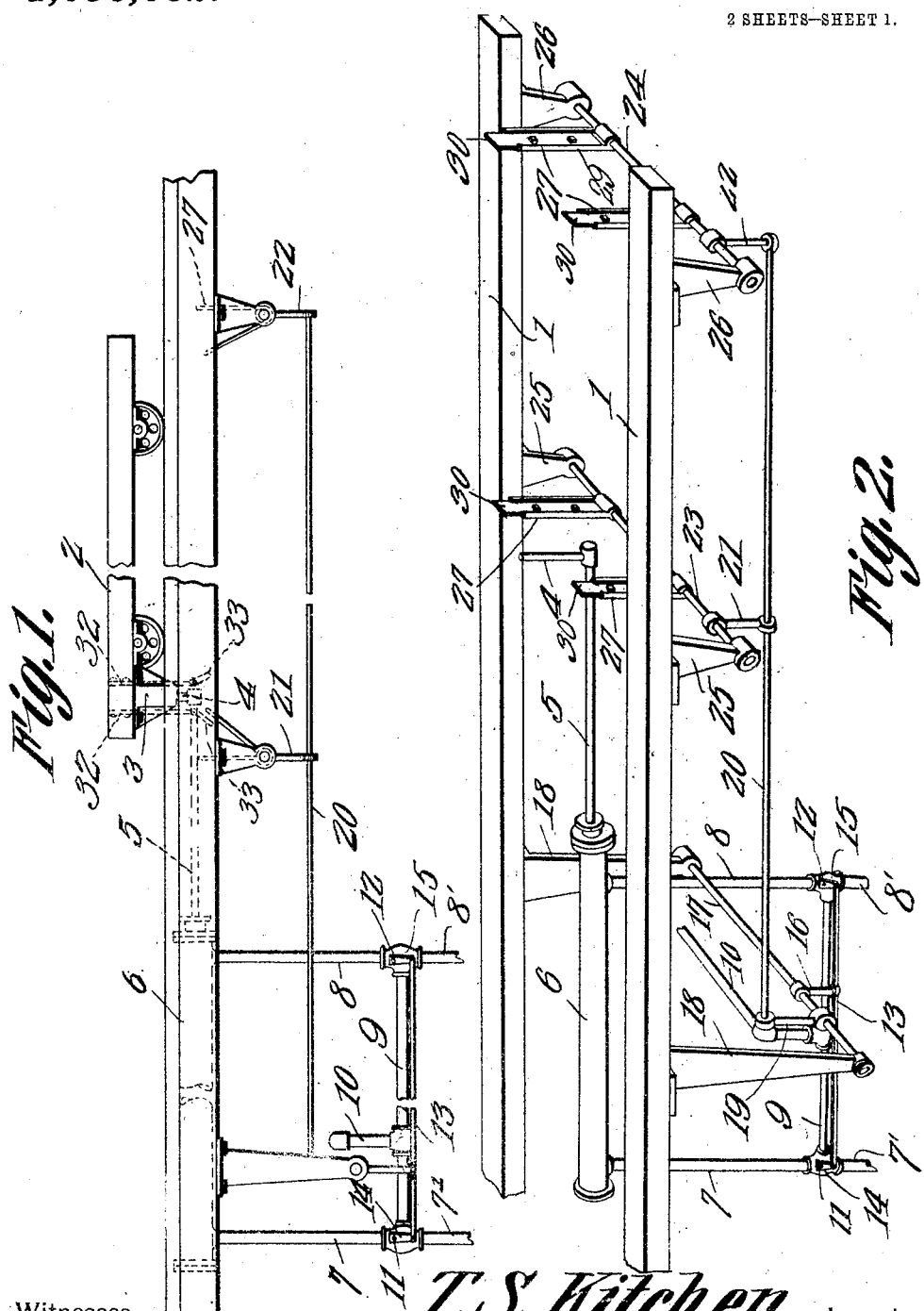

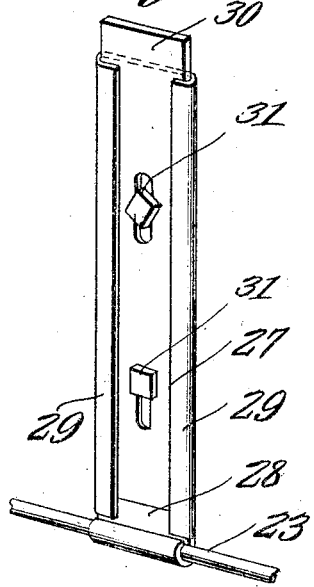
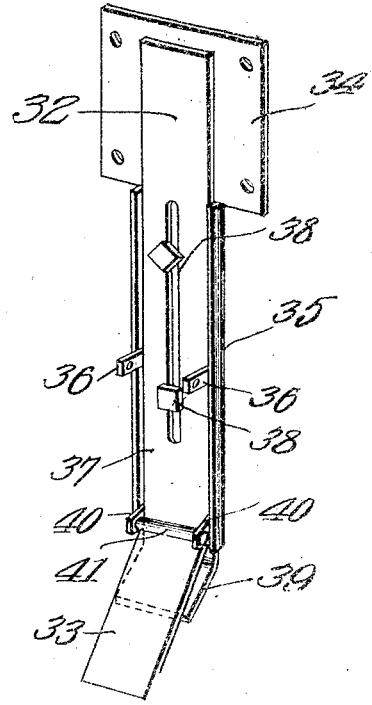
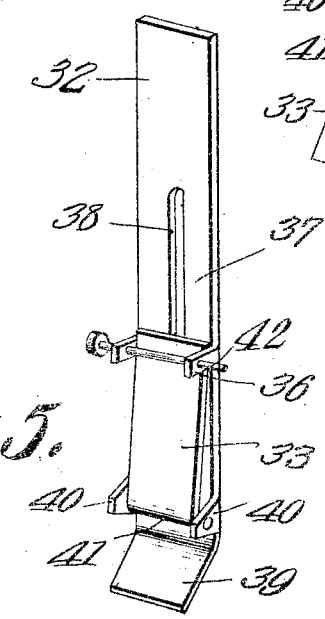

TRACY S. KITCHEN, OF HUNTINGTON, WEST VIRGINIA.

AUTOMATIC SAW-FEED APPARATUS.

1,056,032.

Specification of Letters Patent.

Patented Mar. 18, 1913.

Application filed March 23, 1912. Serial No. 685,762.

*To all whom it may concern:*

Be it known that I, TRACY S. KITCHEN, a citizen of the United States, residing at Huntington, in the county of Cabell and State of West Virginia, have invented a new and useful Automatic Saw-Feed Apparatus, of which the following is a specification.

The present invention relates to improvements in automatic saw feed apparatus, the primary object of the invention being the provision of a means controlled by a pressure fluid reciprocated saw feed carriage or truck, whereby the movement of the said carriage or truck too far at either end of the feed stroke will automatically actuate valves to admit the pressure fluid to the cylinder controlling the reciprocation of the carriage or truck, whereby the said carriage is halted in its movement in one direction and started in the opposite direction, and vice versa, the control of the admission of pressure fluid to said cylinder being also manually controlled as well as automatic, and actuated by coacting devices disposed in the path of travel of the carriage or truck and carried by said carriage or truck.

A further object of this invention is the provision of a novel form of contact arms disposed in the path of a reciprocatory saw feed carriage and operatively connected to the forward and reverse valves of a reciprocating plunger, the carriage also being provided with adjustable means adapted to contact and actuate the said means in the path thereof to control either one of said valves and the consequent direction of movement of the said carriage automatically, should the operator neglect to manually stop and reverse the movement of the carriage.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a side elevation of a portion of the frame of a saw feed with the carriage or truck operating mechanism and the automatic control in operable relation, the carriage and the portion of the track adjacent thereto being broken away and fore shortened. Fig. 2 is a perspective view of the automatic control operably disposed between the tracks, taken from above. Fig. 3 is one of the adjustable arms for actuating the track mechanism. Fig. 4 is one of the adjustable arms carried by the carriage. Fig. 5 is a view showing the actuating trigger thereof in inoperative and locked position.

Referring to the drawings, the numeral 1 designates the usual track upon which is reciprocatingly mounted the saw feed carriage 2, provided with the bolster 3 to which is connected the upright 4 carried upon the outer free end of the piston rod 5 whose piston (not shown) is disposed within the longitudinally disposed cylinder 6, which has communicating with it at opposite ends thereof, the pressure fluid inlet pipes 7 and 8, which are connected to the cross pipe 9 which receives its pressure fluid from the pipe 10 connected to proper pressure fluid source not shown, the pipes 7' and 8' being exhausts.

The cylinder 6 is controlled in the usual way so that the carriage 2 is reciprocated and placed under control of the operator, the present invention, however, relates entirely to an automatic device for preventing the movement of the carriage too far in either direction, to stop the carriage and cause the same to be reversed and moved in the opposite direction.

Disposed in the connection between the cross pipe 9 and the lower end of the pipes 7 and 8 are the three-way valves 11 and 12, whose cranks 14 and 15 are connected for simultaneous movement by means of the link 13, the movement of said link 13 cutting off the valve 15 when opening the valve 14 and when moved in the opposite direction, cutting off the valve 14 and opening the valve 15, thus permitting the pressure fluid to flow from the pipe 10 through one terminal of the branch or cross pipe 9 to the inlet pipe 8 to the cylinder 6, to impart to the piston thereof and its rod 5 and the carriage 2, the proper movement to the left as viewed in Figs. 1 and 2, with relation to the tracks 1 and the saw, not shown. This mechanism is the usual mechanism employed in saw mills, the rod or link 13 being operated manually instead of automatically as will presently appear.

Connected to the link 13 is a lever 16 which is keyed upon the transverse shaft 17 journaled in brackets 18 disposed upon the under side of the respective tracks 1, and having upstanding therefrom a crank arm 19, to which is connected one end of the rod 20, said rod extending below the tracks as clearly illustrated in Figs. 1 and 2 and being connected intermediate of its ends to a crank 21 and at its extreme end to a crank 22 which cranks are keyed to the respective transverse shafts 23 and 24. The shaft 23 is journaled for rocking movement in the lower ends of the brackets 25 which are supported by and underneath of the track 1: while the rocking shaft 24 is supported in the journal brackets 26 parallel to the shaft 23.

Keyed upon the respective shafts 23 and 24 are two upstanding arms 27, which are normally in the position as clearly shown in Fig. 2, each one of said arms as clearly shown in Fig. 3, consisting of a main member 28 provided with parallel retaining and guide flanges 29 for the sliding reception of the contact plate 30, the said contact plate being held in adjusted position by means of the slot and bolt connections 31, whereby the upper end of said plate may be projected or retracted as desired, for the purpose which will presently appear.

As before stated the upper ends of the plates 30, are projected above the track to be abutted by the respective carriage carried arms or fingers 32, there being two of these disposed upon opposite sides of the upright 4, as clearly shown in Fig. 1 and having their lower pivoted triggers 33 disposed to engage the respective plates 30, as will presently appear.

As clearly shown in Fig. 4, the arm 32 consists of the attaching plate 34, and the downwardly extending main support 35 provided with parallel guide strips 36, which form a guide for the adjustable plate 37. This plate 37 is held in the proper adjustment within the support 35 by means of the bolt-and-slot connection 38, the said plate 37 being provided with the out-turned lower end 39 and the pair of eyed lugs 40 to which is connected by means of the pin 41, the pivoted trigger 33. The outturned lower end 39 limits the downward movement of said trigger 33 so as to normally hold it in the inclined position as clearly shown in Figs. 1 and 4. By this means as the carriage is moved toward the shaft 23, the forwardly projecting trigger 33 will engage its respective plate 30 of the shaft 23 and rock the shaft and the rod 20 so as to pull the crank arm 19, and rock the shaft 17, thus closing the valve 14 and opening the valve 15. The pressure fluid now enters through the pipe 7 into the cylinder 6 to impart to the carriage a movement in the opposite direction. The first impulse of the pressure fluid within the cylinder, checks the movement of the carriage 2 before starting it in the opposite direction. When the carriage is moved in the further position to the right as viewed in Fig. 1, the oppositely projecting trigger 33 will engage its plate 30 upon the shaft 24, rocking said shaft 24 so as to cause the crank 22 to push the rod 20, thus closing the valve 15 and opening the valve 14 to bring the carriage to a full stop and cause the pressure fluid to be admitted through the pipe 8 into the forward end of the cylinder 6 and impart to the carriage 2 a movement in the opposite direction.

By pivoting the arms or fingers 32 as shown, the forward trigger 33, when in the position as shown in Fig. 1, will move toward the right to slide over the upper end of said plate 30 without actuating the same, but any movement in the opposite direction will cause the actuation of the arm 27 as before described.

As shown in Figs. 1 and 2, two arms 27 are placed upon each shaft as two triggers 33 are carried by the carriage 2, this being provided so that one of the arms 27 may be actuated to stop and reverse the flow, while the other is actuated by the oppositely disposed trigger 33 to control the valves 14 and 15 to place the same on "center" cutting off the pressure fluid from the cylinder 6 and bringing the carriage 2 to a standstill.

Although two of the arms 27 are shown as mounted upon the two shafts 23 and 24 respectively, it is evident that any number may be employed and if necessary only one of each may be secured to its respective shaft, two being shown in this instance so that a positive and better action may be imparted to the rock shaft 23, and thus insure the manipulation of the valves 14 and 15 from the proper direction and at the proper time.

It may be desired to cut out the automatic manipulation of the rod 20 in one direction, in which event the pivoted trigger 33 of the desired arm 32 may be lifted in the upright position as shown in Fig. 5 and held in place by means of the removable pin 42, which is removably mounted in the eyed lugs 43 of the adjustable plate 37.

What is claimed is:

1. The combination with a saw feed carriage frame, a saw feed carriage mounted thereon for reciprocation, a pressure fluid actuated means disposed in the frame and operably connected to the carriage for imparting a reciprocatory movement thereto, valve controlled pressure fluid conduits leading to the respective ends of said cylinder, means for actuating said valves one of them to closed position and the other to open position and vice versa, a pair of rock shafts disposed in said frame and operably connected to said means, and a series of arms projecting upwardly from said shafts in the path of travel of the case, of a similar number of arms carried by and depending from the carriage adapted to engage said arms to actuate the valves and cause the cylinder to reciprocate the carriage, said arms of the rock shaft and of the carriage being sectional members and adjustably connected together.

2. The combination with a saw feed frame, a saw feed carriage disposed thereon for reciprocation, a pressure fluid cylinder, a piston rod in said cylinder operably connected to said carriage, pressure fluid conducting pipes disposed at opposite ends of said cylinder for oscillating the piston rod to reciprocate the carriage, a valve disposed in each one of said pipes for controlling the admission of pressure fluid to the respective ends of the cylinder, a link connecting said valves for operation in unison, one being closed while the other is open, a rock shaft disposed transversely of the frame and operably connected to said rod, a crank arm carried by said rock shaft and extending upwardly, a rod connected to said crank arm and extending upwardly, a rod connected to said crank arm and extending longitudinally below the frame, two transversely disposed and parallel rock shafts spaced apart and depending from the framework and operably connected to said longitudinally disposed rod, a plurality of arms connected to said transversely disposed rock shafts and depending from the carriage, and arranged in alining pairs for co-action due to the reciprocation of the carriage to actuate the longitudinally disposed rod and valves to admit pressure fluid to the cylinder to reciprocate the carriage.

3. The combination with a pressure fluid reciprocated saw feed carriage, of means carried by the carriage and disposed in the path thereof to control the cut off and admission of pressure fluid to reciprocate the carriage, means carried by the carriage consisting of two adjustably disposed and connected plates, the adjustable plate being provided with an outstanding lip at the lower end thereof, and a pivoted trigger connected thereto and held in inclined locked position by said lip.

In testimony that I claim the foregoing as my own, I have hereto affixed my signature in the presence of two witnesses.

TRACY S. KITCHEN.

Witnesses:
A. G. HASECOSTER,
L. A. PENNINGTON.